(12) United States Patent
Yun et al.

(10) Patent No.: US 8,669,742 B2
(45) Date of Patent: Mar. 11, 2014

(54) BATTERY PACK, CHARGING SYSTEM INCLUDING THE BATTERY PACK, AND METHOD OF CONTROLLING THE CHARGING SYSTEM

(75) Inventors: Han-Seok Yun, Yongin-si (KR); Segawa Susumu, Yongin-si (KR); Eui-Jeong Hwang, Yongin-si (KR); Se-Sub Sim, Yongin-si (KR); Jong-Woon Yang, Yongin-si (KR); Beom-Gyu Kim, Yongin-si (KR); Jin-Wan Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 398 days.

(21) Appl. No.: 13/033,511

(22) Filed: Feb. 23, 2011

(65) Prior Publication Data

US 2012/0032643 A1 Feb. 9, 2012

(30) Foreign Application Priority Data

Aug. 6, 2010 (KR) .......................... 10-2010-0075987

(51) Int. Cl.
*H02J 7/00* (2006.01)
(52) U.S. Cl.
USPC .......................................................... 320/134
(58) Field of Classification Search
USPC .......................................................... 320/134
See application file for complete search history.

(56) References Cited

U.S. PATENT DOCUMENTS 5,959,436 A * 9/1999 Takashina et al. ............ 320/134

2007/0210751 A1 * 9/2007 Wang et al. .................... 320/116
2009/0176146 A1 * 7/2009 Matsuura et al. ............... 429/90
2010/0090652 A1 * 4/2010 Takeda et al. ................. 320/134

FOREIGN PATENT DOCUMENTS

| JP | 2006-271192 | 10/2006 |
| JP | 2009-145139 | 7/2009 |
| KR | 1997-0055049 | 7/1997 |
| KR | 10-0159022 | 8/1998 |
| KR | 10-2007-0096645 | 10/2007 |
| KR | 10-2007-0105220 A | 10/2007 |

OTHER PUBLICATIONS

KIPO Office action dated May 19, 2012, for Korean priority Patent application 10-2010-0075987, (3 pages).
Korean Patent Abstracts for Korean Registration 10-0176781 B1, dated Nov. 14, 1998, corresponding to Korean publication 1997-0055049 listed above.
KIPO Office action dated Oct. 31, 2011 issued in KR 10-2010-0075987, 4 pages.

* cited by examiner

*Primary Examiner* — Arun Williams
(74) *Attorney, Agent, or Firm* — Christie, Parker & Hale, LLP

(57) ABSTRACT

A battery pack, a charging system including the battery pack, and a method of controlling the charging system are disclosed. The battery pack includes a plurality of rechargeable battery cells and a protection circuit for protecting the battery cells. The protection circuit includes an analog front end (AFE) integrated circuit (IC) and a microcomputer. The AFE IC is for supplying an operating voltage of a microcomputer to the microcomputer and to a charging device. Thus, when the battery pack is charged, an abnormal operation of the AFE IC can be detected by the charging device and the charging of the battery pack stopped, thereby preventing an explosion of the battery pack.

19 Claims, 4 Drawing Sheets

BATTERY PACK, CHARGING SYSTEM INCLUDING THE BATTERY PACK, AND METHOD OF CONTROLLING THE CHARGING SYSTEM

CROSS-REFERENCE TO RELATED APPLICATIONS

This application claims priority to and the benefit of Korean Patent Application No. 10-2010-0075987 filed on Aug. 6, 2010 in the Korean Intellectual Property Office, the entire content of which is incorporated herein by reference.

BACKGROUND

1. Field

Aspects of embodiments according to the present invention relate to a battery pack, a charging system including the battery pack, and a method of controlling the charging system.

2. Description of the Related Art

In general, research into rechargeable (secondary) batteries is being actively performed in response to the development of portable electronic devices such as cellular phones, notebook computers, camcorders, and personal digital assistants (PDAs). Examples of rechargeable batteries are a nickel-cadmium battery, a lead storage battery, a nickel metal hydride battery (NiMH), a lithium ion battery, a lithium polymer battery, a metallic lithium battery, and an air zinc storage battery.

SUMMARY

An aspect of an embodiment of the present invention is directed toward a battery pack capable of detecting when it has a malfunction and preventing charging of a battery cell when such a malfunction is detected. Additional aspects of embodiments are directed toward a charging system including the battery pack, and a method of controlling the charging system.

One or more aspects of embodiments of the present invention are directed toward a charging system capable of preventing charging of a battery pack when a charging device detects an inadequate supply of an operating voltage of a microcomputer due to a malfunction of an analog front end IC included in the battery pack. The operating voltage enables the microcomputer to perform a normal operation.

Additional aspects are set forth in part in the description that follows and, in part, will be apparent from the description, or may be learned by routine practice of the presented embodiments.

According to an exemplary embodiment according to the present invention, a battery pack is provided. The battery pack includes a plurality of rechargeable battery cells and a protection circuit. The protection circuit is for protecting the battery cells. The protection circuit includes an analog front end (AFE) integrated circuit (IC). The AFE IC is for outputting an operating voltage of a computing circuit. The protection circuit is configured to output the operating voltage of the computing circuit to a charging device. The charging device is configured to charge the battery pack.

The AFE IC may include an output terminal. The output terminal is configured to output the operating voltage of the computing circuit to the computing circuit and to the charging device.

The charging device may be configured to prevent charging of the battery pack when the operating voltage of the computing circuit input to the charging device is lower than a reference voltage.

The reference voltage may be a voltage for enabling the computing circuit to perform a normal operation.

The computing circuit may include an output terminal. The output terminal is configured to output the operating voltage of the computing circuit to the charging device.

The AFE IC may be configured to generate the operating voltage of the computing circuit by using a voltage of the battery cells.

The battery pack may further include a charging switch and a discharging switch. The charging switch is for controlling charging of the battery pack in accordance with a control of the computing circuit. The discharging switch is for controlling discharging of the battery pack in accordance with a control of the computing circuit.

According to another exemplary embodiment of the present invention, a charging system is provided. The charging system includes a battery pack and a charging device. The battery pack includes a plurality of rechargeable battery cells, an analog front end (AFE) integrated circuit (IC), and a computing circuit. The charging device is for charging the battery pack. The AFE IC is configured to generate an operating voltage of the computing circuit by using a voltage of the battery cells, and to output the operating voltage of the computing circuit to the computing circuit. The battery pack is configured to output the operating voltage of the computing circuit to the charging device. The charging device is configured to compare the operating voltage of the computing circuit with a reference voltage, and to control charging of the battery pack in accordance with the comparison result.

The AFE IC may include an output terminal. The output terminal is configured to output the operating voltage of the computing circuit to the computing circuit and to the charging device.

The charging device may be configured to prevent charging of the battery pack when the operating voltage of the computing circuit is lower than the reference voltage.

The computing circuit may include an output terminal. The output terminal is configured to output the operating voltage of the computing circuit to the charging device.

The battery pack may further include a charging switch and a discharging switch. The charging switch is for controlling charging of the battery pack in accordance with a control of the computing circuit. The discharging switch is for controlling discharging of the battery pack in accordance with a control of the computing circuit.

The reference voltage may be a voltage for enabling the computing circuit to perform a normal operation.

According to yet another exemplary embodiment of the present invention, a method of controlling a charging system is provided. The charging system includes a battery pack and a charging device. The battery pack includes a plurality of battery cells, an analog front end (AFE) integrated circuit (IC), and a computing circuit. The charging device is for charging the battery pack. The method includes: detecting an operating voltage of the computing circuit supplied by the AFE IC; comparing the detected operating voltage of the computing circuit with a reference voltage; and preventing charging of the battery pack when the detected operating voltage of the computer is lower than the reference voltage.

The AFE IC may be configured to generate the operating voltage of the computing circuit by using a voltage of the battery cells. The AFE IC may include an output terminal. The output terminal is configured to output the operating voltage of the computing circuit to the computing circuit and to the charging device. The charging device may be configured to detect the operating voltage of the computing circuit supplied by the AFE IC.

The computing circuit may include an output terminal. The output terminal is configured to output the operating voltage of the computing circuit to the charging device. The charging device may be configured to detect the operating voltage of the computing circuit through the output terminal of the computing circuit.

The method may further include charging the battery pack in accordance with a control of the computing circuit.

The battery pack may further include a charging switch and a discharging switch. The charging switch is for controlling charging of the battery pack in accordance with a control of the computing circuit. The discharging switch is for controlling discharging of the battery pack in accordance with a control of the computing circuit.

The reference voltage may be a voltage that enables the computing circuit to perform a normal operation.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
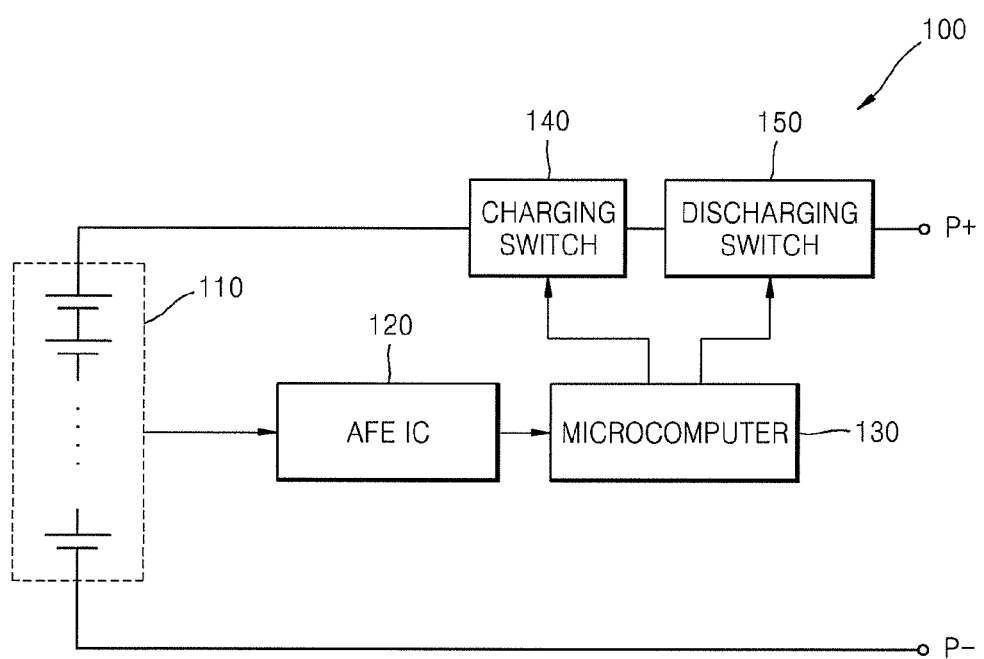
FIG. 1 is a circuit diagram of a battery pack according to an embodiment of the present invention.

Reference will now be made in detail to embodiments, examples of which are illustrated in the accompanying drawings, wherein like reference numerals refer to like elements throughout. In this regard, the described embodiments may have different forms and should not be construed as being limited to the descriptions set forth herein. Accordingly, the embodiments are merely described below, by referring to the figures, to explain aspects of the present invention.

Unless otherwise defined, all terms (including technical and scientific terms) used herein have the same meaning as commonly understood by one of ordinary skill in the art to which the exemplary embodiments belong. It is further understood that terms, such as those defined in commonly used dictionaries, should be interpreted as having a meaning that is consistent with their meaning in the context of the relevant art and are not to be interpreted in an idealized or overly formal sense unless expressly so defined herein.

Secondary batteries may be constructed using a battery pack together with a circuit, and can be charged or discharged through an outer terminal included in the battery pack. The battery pack may contain battery cells and a peripheral circuit including a charge and discharge circuit. The peripheral circuit may be manufactured as a printed circuit board and then combined with the battery cells.

When the battery pack is connected to an external power source through an outer terminal of the battery pack, the battery cells can be charged with power supplied by the external power source through the outer terminal and the charge and discharge circuit. When the battery pack is connected to a load through the outer terminal, power stored in the battery cell can be supplied to the load through the charge and discharge circuit and the outer terminal. In this regard, the charge and discharge circuit controls charging and discharging of the battery cells. A plurality of battery cells that are connected in series or parallel may be used, according to power consumption of the load.

FIG. 1 is a circuit diagram of a battery pack 100 according to an embodiment of the present invention.

Referring to FIG. 1, the battery pack 100 includes a rechargeable battery cell 110 and a protection circuit. The battery pack 100, for example, may be mounted on or in an external system such as a portable notebook computer that performs charging or discharging of the battery cell 110. The battery cell 110 may be a single battery cell or a plurality of battery cells 110 (as shown in FIG. 1). The battery pack 100 includes the battery cell 110, an outer terminal connected to the battery cell 110 in parallel, and a charging switch 140 and a discharging switch 150 that are connected to a high current path (hereinafter referred to as an HCP) in series between the battery cell 110 and the outer terminal.

The battery pack 100 further includes an analog front end (hereinafter referred to as an AFE) integrated circuit (IC) 120 that is connected to the battery cell 110 in parallel, and a computing circuit or IC, for example, microcomputer 130 connected to the charging switch 140 and the discharging switch 150. In addition, the battery pack 100 may further include a fuse for blocking the HCP in accordance with a control of the microcomputer 130 or an external system, and a current detection unit for detecting the magnitude of current flowing through the HCP.

When the microcomputer 130 determines that the battery cell 110 is overcharged or overdischarged, the microcomputer 130 takes appropriate action, such as turning off the charging switch 140 and/or the discharging switch 150, or blowing a fuse, to prevent the overcharging or overdischarging of the battery cell 110. In one embodiment, when the microcomputer 130 determines that the battery cell 110 is overcharged or overdischarged, the microcomputer 130 outputs a corresponding control signal to blow a fuse through a control switch and a heater.

In one embodiment, the battery pack 100 having the structure described above is connected to the external system through the outer terminal and performs charging and discharging of the battery cell 110. The HCP between the outer terminal and the battery cell 110 is used as a charge and discharge path, and a high magnitude of current flows through the HCP. The battery pack 100 may further include a system management (SM) bus for communicating with the external system between the microcomputer 130 of the protection circuit and the outer terminal.

The external system may be a portable electronic device, for example, a portable notebook computer, and the portable electronic device may separately include an adapter for supplying power. When the external system is connected to the adapter, the external system may operate via the adapter. In this case, power provided by the adapter is also supplied to the battery cell 110 through the outer terminal and the HCP so that the battery cell 110 is charged with the provided power. When the external system is separated from the adapter, the battery cell 110 may be discharged by providing power to a load of the external system through the outer terminal.

That is, when the outer terminal is connected to the external system connected to the adapter, charging occurs. In this regard, a charging path runs from the adapter to the battery cell 110 sequentially through the outer terminal, the discharging switch 150, and the charging switch 140. When the external system is separated from the adapter and the load of the separated external system is connected to the outer terminal, discharging occurs. In this regard, a discharging path runs from the battery cell 110 to the external system sequentially through the charging switch 140, the discharging switch 150, and the outer terminal.

The battery cell 110 may be a secondary battery cell that is chargeable and dischargeable. In one embodiment, the battery cell 110 outputs various suitable cell-related information including temperature of a cell, a charging voltage of a cell, and the magnitude of current flowing from a cell to the AFE IC 120.

The charging switch 140 and the discharging switch 150 are connected in series on the HCP between the outer terminal and the battery cell 110, and are used in charging or discharging the battery pack 100. Each of the charging switch 140 and the discharging switch 150 may be a field effect transistor (FET).

The AFE IC 120 is connected to the battery cell 110 in parallel between the charging switch 140 and the discharging switch 150, and is interposed between and connected to the battery cell 110 and the microcomputer 130 in series. The AFE IC 120 detects a voltage of the battery cell 110 and transmits the detected voltage to the microcomputer 130. In addition, the AFE IC 120 generates an operating voltage Vcc of the microcomputer 130 by using the voltage of the battery cell 110. For example, the AFE IC 120 is supplied with the voltage of the battery cell 110, from which the AFE IC 120 generates a regulator voltage of 3.3 V, and outputs the generated regulator voltage to the microcomputer 130.

When the microcomputer 130 is provided with the regulator voltage of 3.3 V (Vcc), the microcomputer 130 uses the supplied regulator voltage as power for operating inner functioning blocks, for example, a control block, a calculation block, and an ND conversion block. However, if the AFE IC 120 malfunctions and fails to supply the regulator voltage of 3.3 V or if the AFE IC 120 malfunctions and an error occurs, the microcomputer 130 may fail to perform a normal operation.

For example, when the battery pack 100 is connected to the charging device and charging occurs, the charging switch 140 is turned on and a charging current flows to the battery cell 110 through the charging device. In this case, however, if the AFE IC 120 malfunctions and fails to provide the operating voltage Vcc of the microcomputer 130, the charging switch 140 may not be turned off. Thus, even when the battery cell 110 is overcharged, charging continues and ultimately, the battery pack 100 may explode.

In one embodiment, the microcomputer 130 is an integrated circuit (or other suitable computing circuit) interposed between and connected to the AFE IC 120 and the external system in parallel, and blocks overcharge, overdischarge, and over current of the battery cell 110 by controlling the charging switch 140 and the discharging switch 150. That is, the microcomputer 130 compares a voltage of the battery cell 110 supplied from the battery cell 110 through the AFE IC 120 with a voltage level that is set in the microcomputer 130 and outputs a corresponding control signal to turn on or off the charging switch 140 and/or the discharging switch 150, thereby preventing overcharge and overdischarge of the battery cell 110.

For example, when the voltage of the battery cell 110 supplied to the microcomputer 130 corresponds to an overcharge level voltage set in the microcomputer 130, for example, 4.35 V or more, the microcomputer 130 determines that the battery cell 110 is overcharged and outputs a corresponding control signal to turn off the charging switch 140. By doing so, charging of the battery cell 110 by the charging device is stopped.

On the other hand, when the voltage of the battery cell 110 supplied to the microcomputer 130 corresponds to an overdischarge level voltage set in the microcomputer 130, for example, 2.30 V or less, the microcomputer 130 determines that the battery cell 110 is overdischarged and outputs a corresponding control signal to turn off the discharging switch 150. By doing so, discharging from the battery cell 110 to the load is stopped.

In the above-described embodiment, the switching operations of the charging switch 140 and the discharging switch 150 are directly controlled in accordance with a control by the microcomputer 130. In other embodiments, the AFE IC 120 is configured to instead control the switching operations of the charging switch 140 and the discharging switch 150 in accordance with a control by the microcomputer 130.

Figure 2:
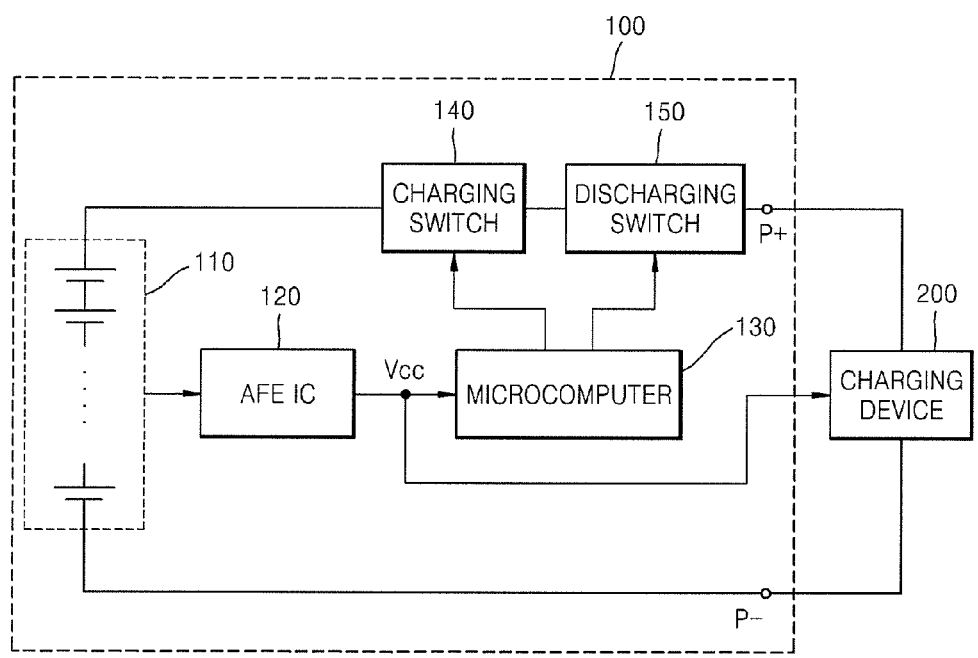
FIG. 2 is a circuit diagram of a charging system including the battery pack of FIG. 1 and a charging device, according to an embodiment of the present invention.

FIG. 2 is a circuit diagram of a charging system including the battery pack 100 of FIG. 1 and a charging device 200, according to an embodiment of the present invention.

Referring to FIG. 2, the charging device 200 is connected to terminals P+ and P− of the battery pack 100 of FIG. 1. The AFE IC 120 includes an output terminal and outputs the operating voltage Vcc of the microcomputer 130, for example, DC 3.3 V (Vcc), to a power input terminal of the microcomputer 130 through the output terminal of the AFE IC 120.

To allow diagnosis of the AFE IC 120, the AFE IC 120 also outputs the operating voltage Vcc of the microcomputer 130 to the charging device 200 through the output terminal of the AFE IC 120. The charging device 200 can then determine if the microcomputer 130 is receiving an appropriate operating voltage Vcc.

In one embodiment, the charging device 200 compares the operating voltage Vcc of the microcomputer 130 (input, for example, through an input terminal of an A/D converter included in the charging device 200) with a reference voltage. In another embodiment, when the input operating voltage Vcc is lower than the reference voltage (for example, if the input operating voltage Vcc is 0), the charging device 200 determines that the AFE IC 120 is malfunctioning and prevent flow of a charging current to the battery pack 100. In this regard, the reference voltage is a voltage that enables the microcomputer 130 to perform a normal operation. For example, the reference voltage may be 3.3 V or a voltage within an allowable margin of error of 3.3 V.

The charging device 200 detects the voltage input into the microcomputer 130 from the output terminal of the AFE IC 120, determines whether the AFE IC 120 is performing a normal operation by comparing the input voltage with the reference voltage, and stops charging the battery pack 100 when appropriate based on this comparison. For example, suppose that even though the battery pack 100 is charged, the charging switch 140 is turned on and a charging current is flowing to the battery cell 110 through the charging device 200. In this case, even when the AFE IC 120 malfunctions and fails to supply the operating voltage Vcc of the microcomputer 130, and even when the microcomputer 130 does not determine that the battery cell 110 is being overcharged and does not turn off the charging switch 140, the charging device 200 may stop charging of the battery pack 100 and thus, unintended effects, such as explosion of the battery pack 100, may be prevented.

Figure 3:
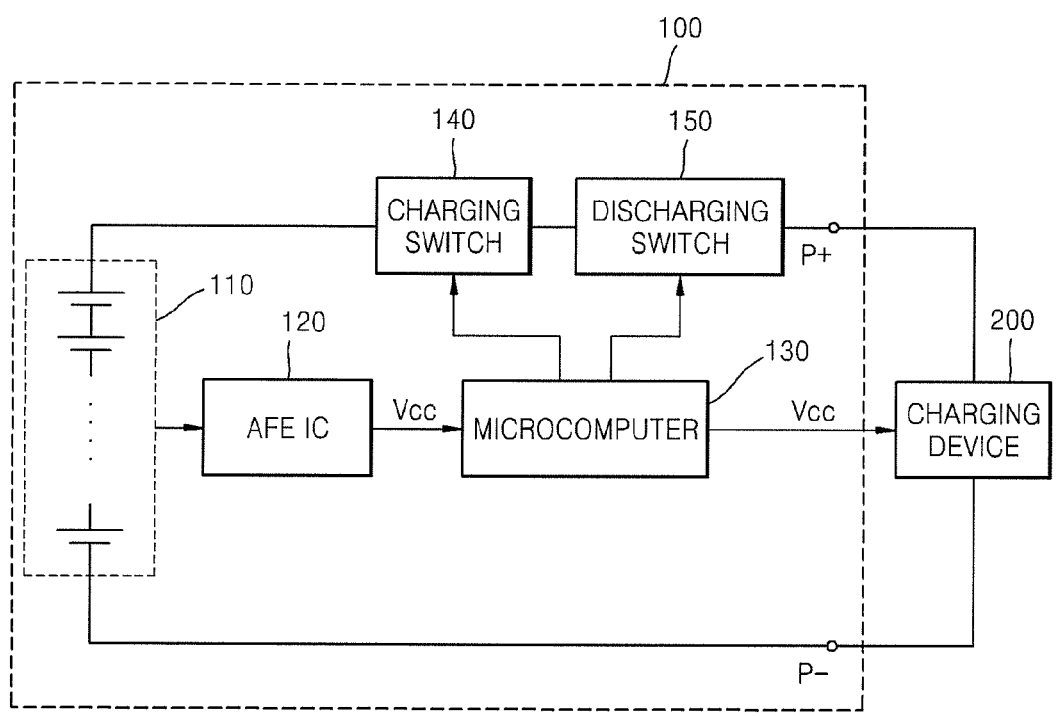
FIG. 3 is a circuit diagram of a charging system including the battery pack of FIG. 1 and a charging device, according to another embodiment of the present invention.

FIG. 3 is a circuit diagram of a charging system including the battery pack 100 of FIG. 1 and a charging device 200, according to another embodiment of the present invention.

Referring to FIG. 3, the charging device 200 is connected to terminals P+ and P− of the battery pack 100 of FIG. 1. The charging system according to the embodiment of FIG. 3 is different from the charging system of FIG. 2 in that the operating voltage Vcc of the microcomputer 130 input from the AFE IC 120 is output to the charging device 200 through an output terminal of the microcomputer 130 (in place of the output terminal of the AFE IC 120).

In the charging system of FIG. 3, the operating voltage Vcc of the microcomputer 130 (input to the charging device 200 through the output terminal of the microcomputer 130) is input to an input terminal of the charging device 200, for example, an input terminal of an A/D converter. The charging device 200 includes a control unit, for example, a microcomputer unit (MCU) or other IC, and the MCU compares the operating voltage Vcc of the microcomputer 130 input to the input terminal of the A/D converter with a reference voltage. When, for example, the input operating voltage Vcc is lower than the reference voltage, the charging device 200 determines that the AFE IC 120 is malfunctioning and stops the flow of a charging current to the battery pack 100.

Figure 4:
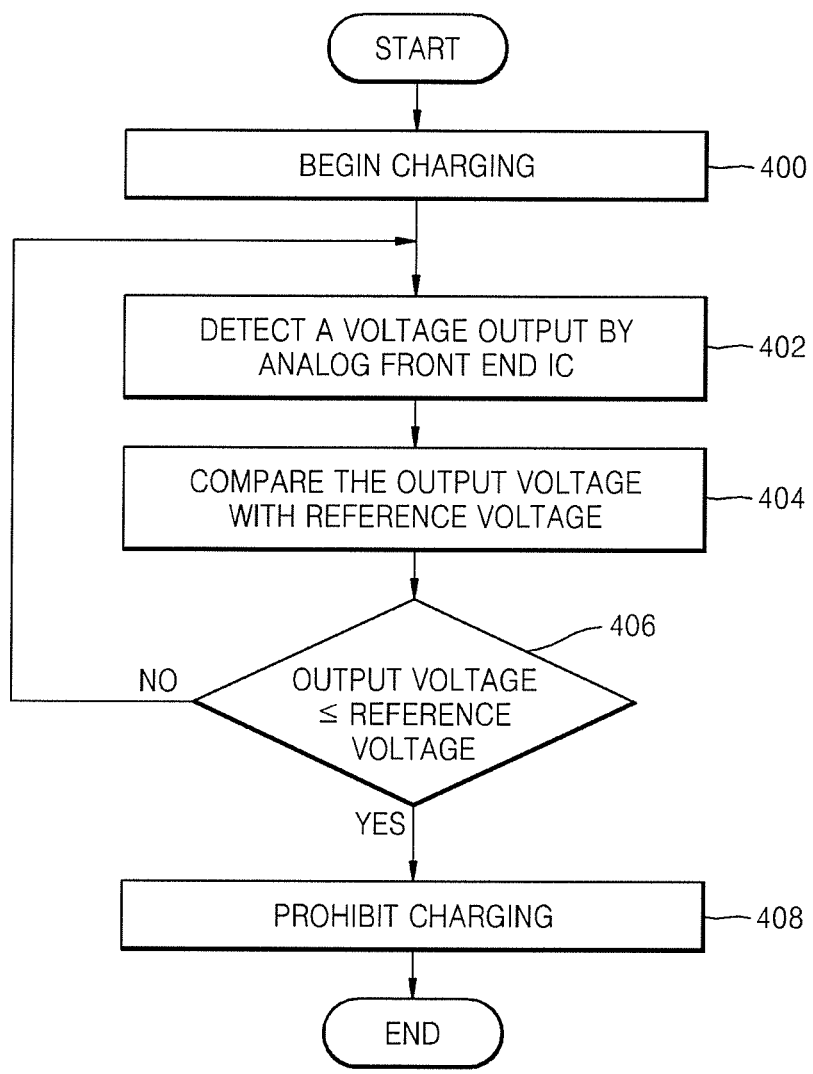
FIG. 4 is a flowchart for explaining a method of controlling a charging system according to an embodiment of the present invention.

FIG. 4 is a flowchart for explaining a method of controlling a charging system according to an embodiment of the present invention.

Referring to FIG. 4, in operation 400, a charging device is connected to a battery pack and charging begins. In operation 402, an output voltage of an AFE IC of the battery pack is detected. Here, the output voltage is an operating voltage used as an internal power for operating a microcomputer of the battery pack. In addition, the detecting of the output voltage may be performed by the charging device through, for example, an output terminal of the AFE IC or an output terminal of the microcomputer.

In operation 404, the output voltage is compared with a reference voltage. In this regard, the reference voltage may be an operating voltage of the microcomputer or a voltage that is within a margin of error in which the microcomputer may perform a normal operation. In operation 406, if the output voltage is lower than the reference voltage, operation 408 is performed and charging of the battery pack is prohibited (prevented).

Accordingly, when the battery pack is charged, overcharging due to non-operation of a protection circuit due to no supply (or an inadequate supply) of power to the microcomputer occurring when the AFE IC malfunctions may be prevented in advance.

As described above, according to one or more embodiments of the present invention, when a battery pack is connected to a charging device and is charged, a malfunction of an AFE (that supplies an operating voltage to a microcomputer included in the battery pack) is detectable in advance and charging is stopped. Thus, unintended consequences, such as an explosion of the battery pack, may be prevented.

In addition, unintended charging may be prevented by determining whether the battery pack is malfunctioning. When an AFE IC included in the battery pack malfunctions and an operating voltage that enables the microcomputer to perform a normal operation is not provided, the charging device detects the malfunction and prevents charging of the battery pack.

Other embodiments of the present invention can be implemented through computer readable code in/on a computer readable recording medium. The computer readable recording medium may correspond to any recording medium/media permitting the storage of the computer readable code.

Examples of the computer readable recording medium include ROM, RAM, flash memory, CD-ROM, magnetic tape, floppy disks, and optical data storage media. In addition, the computer readable recording medium may be distributed in a computer system connected by a network, and the computer readable code may be stored and executed in a distributed fashion. Furthermore, suitable functional programs, codes, and code segments for embodying the present invention should be apparent to one of ordinary skill in the art to which the present invention pertains.

It should be understood that the exemplary embodiments described herein should be considered in a descriptive sense only and not for purposes of limitation. Descriptions of features or aspects within each embodiment should be considered as available for other similar features or aspects in other embodiments. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
a plurality of rechargeable battery cells; and
a protection circuit for protecting the battery cells, the protection circuit comprising an analog front end (AFE) integrated circuit (IC) for outputting an operating voltage of a computing circuit,
wherein the protection circuit is configured to output the operating voltage of the computing circuit to a charging device configured to charge the battery pack.

2. The battery pack of claim 1, wherein the AFE IC comprises an output terminal configured to output the operating voltage of the computing circuit to the computing circuit and to the charging device.

3. The battery pack of claim 1, wherein the charging device is configured to prevent charging of the battery pack when the operating voltage of the computing circuit input to the charging device is lower than a reference voltage.

4. The battery pack of claim 3, wherein the reference voltage is a voltage for enabling the computing circuit to perform a normal operation.

5. The battery pack of claim 1, wherein the computing circuit comprises an output terminal configured to output the operating voltage of the computing circuit to the charging device.

6. The battery pack of claim 1, wherein the AFE IC is configured to generate the operating voltage of the computing circuit by using a voltage of the battery cells.

7. The battery pack of claim 1, further comprising:
a charging switch for controlling charging of the battery pack in accordance with a control of the computing circuit; and
a discharging switch for controlling discharging of the battery pack in accordance with a control of the computing circuit.

8. A charging system comprising:
a battery pack comprising a plurality of rechargeable battery cells, an analog front end (AFE) integrated circuit (IC), and a computing circuit; and
a charging device for charging the battery pack,
wherein the AFE IC is configured to generate an operating voltage of the computing circuit by using a voltage of the battery cells, and to output the operating voltage of the computing circuit to the computing circuit, wherein the battery pack is configured to output the operating voltage of the computing circuit to the charging device, and wherein the charging device is configured to compare the operating voltage of the computing circuit with a reference voltage, and to control charging of the battery pack in accordance with the comparison result.

9. The charging system of claim 8, wherein the AFE IC comprises an output terminal configured to output the operating voltage of the computing circuit to the computing circuit and to the charging device.

10. The charging system of claim 8, wherein the charging device is configured to prevent charging of the battery pack when the operating voltage of the computing circuit is lower than the reference voltage.

11. The charging system of claim 8, wherein the computing circuit comprises an output terminal configured to output the operating voltage of the computing circuit to the charging device.

12. The charging system of claim 8, wherein the battery pack further comprises:
   a charging switch for controlling charging of the battery pack in accordance with a control of the computing circuit; and
   a discharging switch for controlling discharging of the battery pack in accordance with a control of the computing circuit.

13. The charging system of claim 8, wherein the reference voltage is a voltage for enabling the computing circuit to perform a normal operation.

14. A method of controlling a charging system comprising a battery pack comprising a plurality of battery cells, an analog front end (AFE) integrated circuit (IC), and a computing circuit; and the charging system further comprising a charging device for charging the battery pack, the method comprising:
   outputting by the battery pack an operating voltage of the computing circuit to the charging device;
   detecting by the charging device the operating voltage of the computing circuit supplied by the battery pack;
   comparing the detected operating voltage of the computing circuit with a reference voltage; and
   preventing charging of the battery pack when the detected operating voltage of the computing circuit is lower than the reference voltage.

15. The method of claim 14, wherein
   the AFE IC is configured to generate the operating voltage of the computing circuit by using a voltage of the battery cells,
   the AFE IC comprises an output terminal configured to output the operating voltage of the computing circuit to the computing circuit, and
   the charging device is configured to detect the operating voltage of the computing circuit supplied by the AFE IC.

16. The method of claim 14, wherein
   the computing circuit comprises an output terminal configured to output the operating voltage of the computing circuit to the charging device, and
   the charging device is configured to detect the operating voltage of the computing circuit through the output terminal of the computing circuit.

17. The method of claim 14, further comprising charging the battery pack in accordance with a control of the computing circuit.

18. The method of claim 14, wherein the battery pack further comprises:
   a charging switch for controlling charging of the battery pack in accordance with a control of the computing circuit; and
   a discharging switch for controlling discharging of the battery pack in accordance with a control of the computing circuit.

19. The method of claim 14, wherein the reference voltage is a voltage that enables the computing circuit to perform a normal operation.

* * * * *